(12) United States Patent
Davis

(10) Patent No.: US 11,793,173 B2
(45) Date of Patent: Oct. 24, 2023

(54) APIARY AWNING

(71) Applicant: Rodney Davis, Crawfordville, FL (US)

(72) Inventor: Rodney Davis, Crawfordville, FL (US)

( * ) Notice: Subject to any disclaimer, the term of this patent is extended or adjusted under 35 U.S.C. 154(b) by 28 days.

(21) Appl. No.: 17/140,014

(22) Filed: Jan. 1, 2021

(65) Prior Publication Data

US 2021/0204525 A1 Jul. 8, 2021

Related U.S. Application Data

(60) Provisional application No. 62/956,715, filed on Jan. 3, 2020.

(51) Int. Cl.
*A01K 47/06* (2006.01)

(52) U.S. Cl.
CPC .................. *A01K 47/06* (2013.01)

(58) Field of Classification Search
CPC ........................................ A01K 47/06
USPC ........................................ 449/3, 16
See application file for complete search history.

(56) References Cited

U.S. PATENT DOCUMENTS

| | | | | |
|---|---|---|---|---|
| 202,114 A | * | 4/1878 | Macy | A01K 47/00 449/41 |
| 207,731 A | * | 9/1878 | Gale | A01K 47/06 449/13 |
| 768,370 A | * | 8/1904 | Jackson | A01K 47/00 449/16 |
| 1,387,734 A | * | 8/1921 | Nitsch | A01K 47/06 449/20 |
| 1,470,112 A | * | 10/1923 | Cottam | A01K 47/06 449/16 |
| 1,584,775 A | * | 5/1926 | Jonian | A01K 47/00 449/13 |
| 2,599,141 A | * | 6/1952 | Taylor | A01K 47/06 449/12 |
| 2,858,801 A | * | 11/1958 | Chance | A01K 5/0225 |
| 2,895,185 A | * | 7/1959 | Preaus | E04F 10/08 52/76 |
| 3,200,419 A | * | 8/1965 | Root | A01K 47/06 449/2 |

(Continued)

FOREIGN PATENT DOCUMENTS

| CN | 2284273 Y | * | 6/1998 |
|---|---|---|---|
| CN | 107027656 A | * | 8/2017 |

(Continued)

OTHER PUBLICATIONS

English-language translation of Fu, CN 107027656 A (Year: 2017).*
English-language translation of Zhang, CN 2284273 Y (Year: 1998).*

*Primary Examiner* — Joshua J Michener
*Assistant Examiner* — Henry Hooper Mudd
(74) *Attorney, Agent, or Firm* — Brennan, Manna & Diamond, LLC

(57) ABSTRACT

An apiary accessory to protect an apiary entrance from rain, flooding, excessive heat, wind, and other elements and debris. The awning device has rectangular planar sheet with lateral or transverse and longitudinal edges. The awning device is secured to front surface of the apiary using a securing sheet that is fastened thereto using mechanical fasteners. During use, the awning device extends over the entrance of the apiary to protect the same and may further comprise one or more sensors for sensing conditions related to the apiary.

14 Claims, 4 Drawing Sheets

(56) References Cited

U.S. PATENT DOCUMENTS

| | | | | |
|---|---|---|---|---|
| 4,257,133 | A * | 3/1981 | Steinrucken | A01K 47/06 449/12 |
| 5,509,846 | A * | 4/1996 | Kueneman | A01K 47/00 449/11 |
| 7,632,167 | B1 * | 12/2009 | Miller | A01M 1/103 449/15 |
| 8,152,590 | B2 * | 4/2012 | Brundage | A01K 47/06 449/2 |
| 9,101,116 | B1 * | 8/2015 | Watson | A01K 47/06 |
| 2003/0162478 | A1 * | 8/2003 | Malacsina | A01K 59/00 449/5 |
| 2008/0280528 | A1 * | 11/2008 | Mudd | A01K 51/00 449/2 |
| 2015/0156984 | A1 * | 6/2015 | Anderson | A01K 3/002 256/73 |
| 2017/0079249 | A1 * | 3/2017 | Chapa | G01G 19/52 |
| 2017/0328126 | A1 * | 11/2017 | Bonge, Jr. | A01K 11/006 |
| 2017/0360010 | A1 * | 12/2017 | Wilson-Rich | A01K 47/06 |
| 2019/0357502 | A1 * | 11/2019 | Collinson | A01K 47/06 |

FOREIGN PATENT DOCUMENTS

| | | | | | |
|---|---|---|---|---|---|
| CN | 107372202 | A | * | 11/2017 | |
| FR | 3069412 | B1 | * | 8/2019 | A01K 47/06 |
| GB | 191506239 | A | * | 1/1916 | A01K 47/06 |

\* cited by examiner

APIARY AWNING

CROSS-REFERENCE TO RELATED APPLICATION

The present application claims priority to, and the benefit of, U.S. Provisional Application No. 62/956,715, which was filed on Jan. 3, 2020 and is incorporated herein by reference in its entirety.

FIELD OF THE INVENTION

The present invention relates generally to the field of apiary accessories. More specifically, the present invention relates to a small awning or shielding device for use with a bee box that extends over the entrance of the bee box and offers protection to the same from rainwater, flooding, excessive heat and more. The awning device utilizes a reflective material, such as a prismatic film or beaded material, to minimize the heat absorption and reflect heat and light away from the hive entrance, thereby lowering the overall temperature within the bee box. Moreover, the awning device prevents moderate winds from disturbing the interior of the bee box and/or making it too cold on the interior of the box. Additionally, the awning device features a fastening mechanism for securely attaching the device to the front of the bee box, and may be manufactured in a variety of different sizes and/or configurations to accommodate bee boxes having different openings or configurations. Accordingly, the present disclosure makes specific reference thereto. Nonetheless, it is to be appreciated that aspects of the present invention are also equally applicable to other like applications, devices, and methods of manufacture.

BACKGROUND OF THE INVENTION

By way of background, apiaries, bee boxes and beehives are used by beekeepers for various purposes, such as honey production, pollination of nearby crops, a housing supply for apitherapy treatments, etc. Typically, a beehive is a tool for managing bee populations or bee farming, which provides a means for harvesting honey, while providing a house for the bees to live in. The beehive also provides a place where the queen bee may lay her eggs, and the worker bees store honey and pollen. In the state of the art, various types of bee boxes, equipment and tools are utilized for honey harvesting and other purposes.

Most beehives or bee boxes are comprised of several sections, such as a bottom board, a hive body, a honey storage section, frames, a lid, etc. Many bee boxes are left exposed to the elements, and the entrance of the box may allow the weather conditions occurring outside the bee box to enter the interior of the box, such as rain, wind, snow and the like. More specifically, since the entrance to the bee box is always left open for the bees to enter and exit the box as needed, rainwater can make its way into the box, thereby causing the formation of mold and mildew as well as flooding if too much water enters the box. Further, excessive heat during the summertime can raise the temperature of the interior of the box, and make it incredibly uncomfortable for the bees residing therein. For example, adult bees begin to die at around 113° F. When the interior temperature of the hive reaches 97° F., most bees will begin to vent the hive or box by flapping their wings. Furthermore, in winter, the entrance may be covered by snow and ice build-up, thereby blocking the way for bees to enter and exit the bee box.

Currently, many existing beehives and bee boxes are unprotected from the effects of wind, rain, heat and snow, which deeply affects honey harvesting, pollination of nearby crops, the housing supply for apitherapy treatment, and other efforts of the beekeeper. For example, if the bees cannot easily enter and exit the hive to collect nectar from the nearby plants, the bees cannot make honey, and the plants will not be pollinated. Further, excessive heat within the box or hive, as well as the presence of mold or mildew, may kill off substantial portions of the bee population or cause the bees to abandon the hive or box, neither of which is desirable for the beekeeper.

To prevent rainwater from entering the beehive, many beekeepers will use a heavy cotton cloth to cover the entrance of the bee box. However, when the beekeeper covers or otherwise seals the entrance of the bee box with a heavy cotton cloth or similar material, the temperature and humidity inside the bee box rises, and mold may begin to form or propagate inside the bee box, which may be detrimental to the health of the bees. Still other beekeepers will build a stand for the beehive to elevate the same and reduce the risk of flooding in low lying areas or those areas otherwise prone to flooding. However, the stand alone will typically not prevent rainwater, heat, wind or snow from entering the interior of the bee box or hive via the opening.

Therefore, there exists a long felt need in the art for a bee box or apiary accessory that provides and helps to maintain an appropriate environment for the bees. There is also a long felt need in the art for an apiary accessory that prevents the bee box from becoming damaged in extreme weather conditions, such as heat, rain, snow, wind, and the like. Additionally, there is a long felt need in the art for an apiary accessory that enables a beekeeper to properly harvest honey and perform other beehive functions in different weather conditions, without damaging the bee box. Moreover, there is a long felt need in the art for an apiary accessory that does not unduly interfere with the lives and production of the bees inhabiting the bee box. Finally, there is a long felt need in the art for an apiary accessory that is relatively inexpensive to manufacture, that is both safe and easy to use, and that can accommodate bee boxes of various sizes and configurations.

The subject matter disclosed and claimed herein, in one embodiment thereof, comprises a multipurpose protective bee awning for an apiary. The awning structure comprises a rectangular sheet having two longitudinal edges and two side or transverse edges. A securing member is attached to a first longitudinal edge of the rectangular sheet and is disposed at an angle ranging from 90° to about 160° depending on the positioning near the entrance to the apiary. Protective shade members are attached along the side or transverse edges and the second longitudinal edge of the rectangular sheet member. The protective shade members are smaller in size than the rectangular sheet. The outer surface of the apiary awning is preferably coated with a material which serves to reflect heat and light, rather than absorb the same which may lead to increased temperatures within the bee box. The invention offers a novel and effective solution that protects the interior of the apiary from rain, flooding, excessive heat, moderate winds, and the like.

In this manner, the apiary awning of the present invention accomplishes all of the forgoing objectives, and provides a relatively convenient and effective solution to protect the apiary from all weather conditions, such as rainwater, heat, snow, wind or the like. The apiary awning of the present invention is also user friendly, inasmuch it can be easily attached to (and removed from) the apiary as needed, and is available in different sizes to accommodate bee boxes of different styles, sizes and configurations.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a multipurpose protective awning device for an apiary. The apiary awning device comprises a one-piece rectangular sheet having an upper pivoting edge, and a lower protruding edge which extends in a direction opposite the upper pivoting edge. Two side edges are provided along a transverse edge and are generally perpendicular to the rectangular sheet. A securing sheet may be attached to the upper pivoting edge, and has a fastening means to secure the apiary awning tool over the entrance of the apiary. The rectangular sheet is preferably disposed in a declining position from the side edge or wall of the apiary, and the lower protruding edge lies below the upper pivoting edge. When the apiary awning tool is positioned over the entrance of the apiary, the side edges are of a sufficient length such that they extend behind the securing sheet to attach to the side walls of the apiary to give additional support to the bee box awning structure.

In a further embodiment of the present invention, an apiary awning device is manufactured using recyclable plastics or renewable components, such as those made from biomass or other similar material, provided that the same are durable enough to handle extreme weather conditions while also protecting the bee box. The apiary awning device is further comprised of a reflective material on its upper surface to reflect heat and light from the sun in order to maintain a moderate temperature inside the bee box and one that should not exceed 95° Fahrenheit.

In a further embodiment of the present invention, a combination apiary and awning device is disclosed. The apiary comprises a bottom board, an entrance portion, a hive body, a lid, and a unique awning device attached to a front surface of the apiary at a predetermined height above the bottom board and adjacent to the entrance portion of the apiary. The awning device comprises a hanging structure over the entrance, and has a reflective surface to reflect heat and light away from the apiary. The awning also protects the apiary entrance from other weather conditions, such as wind, rainwater, snow or the like. The awning device is secured to the outer surface of the apiary using a fastening mechanism, such as screws, to secure the awning device over the entrance of the apiary such that the rectangular awning device is in a downwardly sloped position, thereby protecting the entrance from inclement weather. The front surface of the rectangular opening may also be provided with a channel to divert rainwater away and down the sides of the awning so that the rainwater does not simply flow over the front edge of the awning structure and into the opening.

In a further embodiment of the present invention, a method of securely attaching an awning device to an apiary is disclosed. The method comprises the initial step of securing a sheet of the apiary device over the entrance of the apiary at a predetermined height, such that the rectangular protective surface of the bee awning device is in a downward sloping position and protects the entrance of the apiary. Next, one or more side protective panels of the awning device are positioned on the side surfaces of the apiary. The sheet is secured by placing screws in pre-drilled holes on the securing member of the awning device. Finally, the screws are tightened to firmly attach the bee awning device to the apiary.

In yet another embodiment of the present invention, a portable or removable awning device for an apiary is disclosed. The awning device comprises a generally rectangular shaped roof with a reflective coating. The rectangular roof has a back edge, a front edge, and a securing sheet, with the securing sheet being attached over a bee box entrance on the front surface of the bee box and above the rectangular roof panel. The back edge is attached to the securing sheet such that the rectangular roof extends over the entrance of the bee box in a downwardly sloping manner of approximately 25-50 degrees relative to the securing sheet and side wall of the apiary, with the front edge of the rectangular plate being closer to the entrance of the bee box than the securing plate to protect the entrance from sun, rain, snow, wind, etc. The apiary awning device also has a channel or groove between the securing panel and the roof structure to allow the awning structure to be set at different angles over an entrance of the bee box.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE INVENTION

Figure 1:
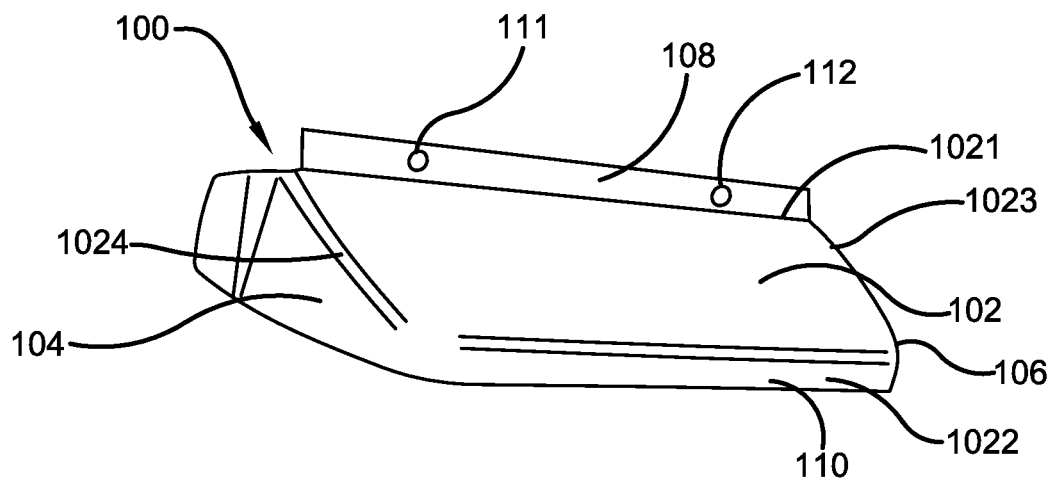
FIG. 1 illustrates a perspective view of one potential embodiment of the apiary awning device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a bee box or apiary accessory that provides, and helps to maintain, an appropriate environment for bees, and that prevents the bee box from becoming damaged in extreme weather conditions such as heat, rain, snow, wind and the like. Additionally, there is a long felt need in the art for an apiary accessory that enables a beekeeper to properly harvest honey and perform other beehive functions in different weather conditions without damaging the bee box, and that does not unduly interfere with the lives and production of the bees inhabiting the bee box. Finally, there is a long felt need in the art for an apiary accessory that is relatively inexpensive to manufacture, that is both safe and easy to use, and that can accommodate bee boxes of various sizes and configurations.

The present invention, in one exemplary embodiment, comprises a multipurpose protective awning device for an apiary. The awning device comprises a one-piece generally rectangular sheet having an upper pivoting edge, a lower protruding edge, two side edges, and a securing sheet attached to the upper pivoting edge. The securing sheet has a fastening means to secure the awning over the entrance of a bee box, wherein the rectangular planar sheet is in a downwardly sloping position when compared to the side wall of the apiary, and the lower protruding edge is positioned lower than the upper pivoting edge after the awning is fixed over the entrance of the apiary. The side edges are of a sufficient length such that they extend behind the securing sheet to attach to the side walls of the apiary to give additional support to the awning. The awning device offers protection from rain, flooding, excessive heat, moderate winds and the like.

Referring initially to the drawings, FIG. 1 illustrates a perspective view of one potential embodiment of the apiary awning device 100 of the present invention in accordance with the disclosed architecture. More specifically, awning device 100 is a relatively small awning that extends over an entrance of an apiary to protect the same from rainwater, flooding, excessive heat, and more. The awning device 100 has a generally rectangular shaped roof or panel 102 to reflect light and heat, and to protect against snow and rain. The roof or panel 102 has an upper pivoting edge 1021 which is permanently attached to a securing member 108. The securing member 108 is a relatively thin sheet of plastic or other suitable material which has two or more holes or continuous openings 111, 112 therein to receive screws to attach the securing member 108 to a front surface or wall of the apiary. The roof 102 is further comprised of a lower protruding edge 1022 which extends outwardly from the apiary, and that is both unattached to the wall of the apiary and that is closer to the ground surface upon which the apiary rests when the awning device 100 extends over the entrance of the apiary.

Figure 3:
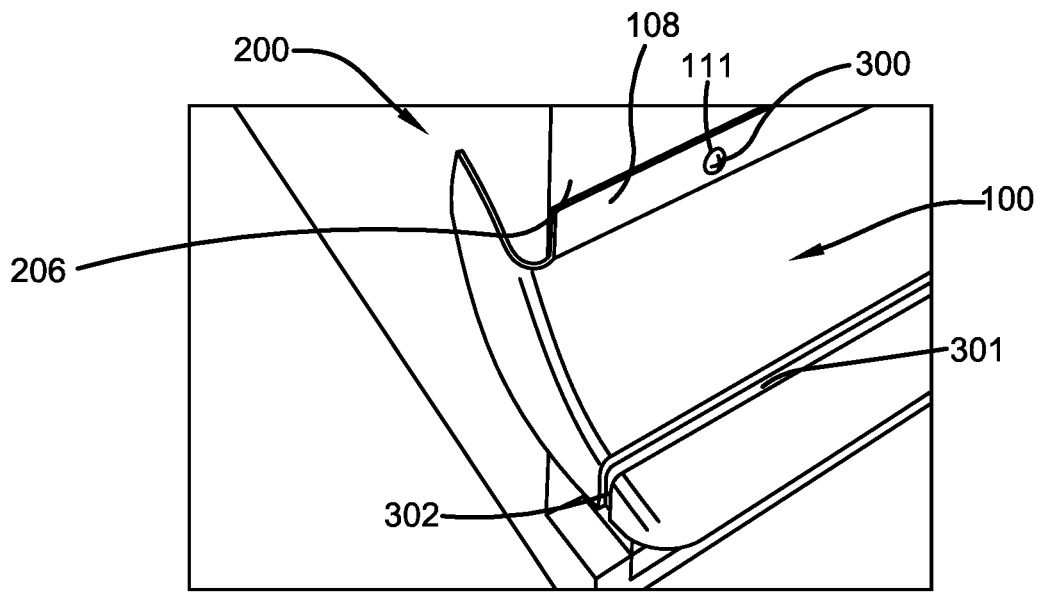
FIG. 3 illustrates a partial perspective view of one potential embodiment of the apiary awning device of the present invention in accordance with the disclosed architecture.
Figure 5:
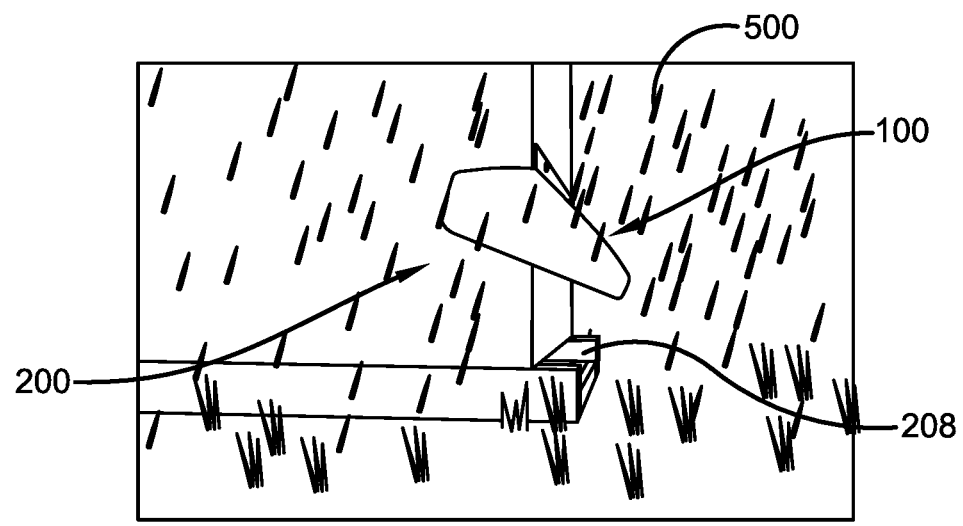
FIG. 5 illustrates a side perspective view of one potential embodiment of the apiary awning device of the present invention in accordance with the disclosed architecture, wherein the apiary device is positioned to protect the entrance of the apiary from inclement weather.

The awning device 100 is further comprised of two spaced apart side edges 1023, 1024, which are generally triangular in shape and that extend past the securing member 108 such that the side edges 1023, 1024 can be attached to the side walls of the apiary when the awning device 100 is secured over the entrance of the apiary, as best shown in FIGS. 1, 3 and 5. The roof 102 of the awning device 100 preferably does not comprise any sharp edges, but has a front shade member 110 which has the appearance of a molding extending from the lower protruding edge 1022, as best shown in FIG. 1. Similarly, side protective panels 104, 106 are present on the side edges 1024 and 1023, respectively. As explained more fully below, the awning device 100 can be easily attached/detached from the apiary by screwing/unscrewing the screws (or other fasteners) through openings 111, 112, and, when properly installed, the awning device 100 hangs slightly over the apiary entrance and is available in various sizes to accommodate all types, sizes and configurations of apiaries.

In the preferred embodiment, the awning device 100 is comprised of recycled plastics, biomass or other renewable materials, such as bamboo, etc. As explained more fully below with respect to FIGS. 7, 8A and 8B, the awning device 100 preferably further comprises a reflective coating or material on the rectangular or roof surface 102 that is designed to reflect heat and light away from the entrance of the apiary. The awning device 100 protects against rain, reflects sunlight, and also protects against other elements or debris from entering/blocking the apiary entrance. The awning device 100 also permits bearding of the bees in hot weather, so that the same may cool off. In winter, the awning device 100 protects against snow and ice building up, and allows the bees to freely enter and exit the apiary. The bee awning device 100 also enhances hive air circulation, and reduces moisture buildup.

Figure 2:
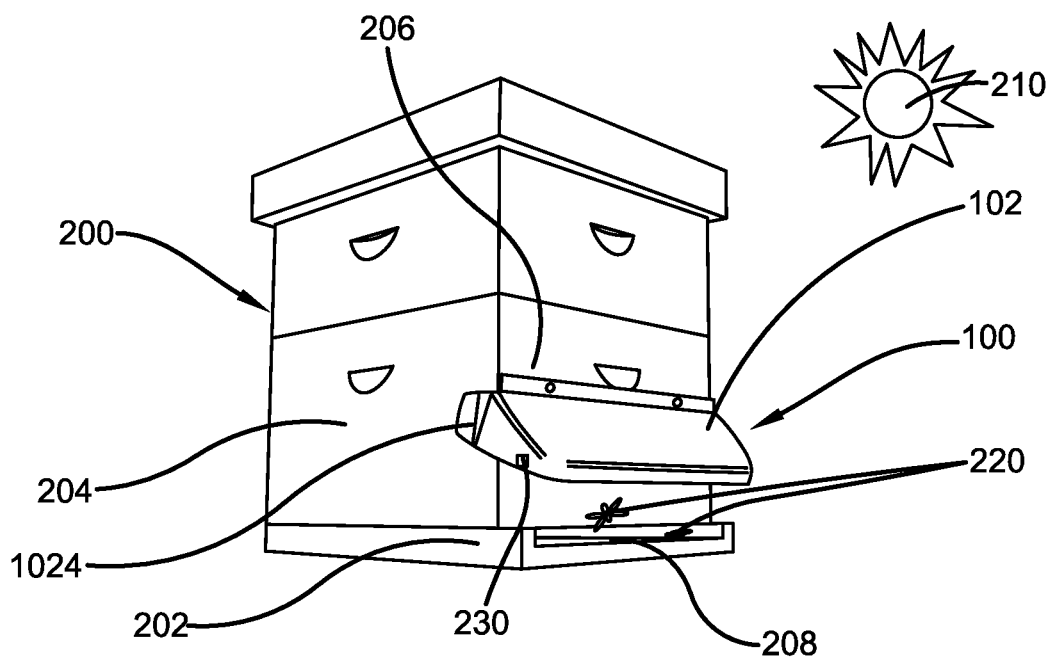
FIG. 2 illustrates a perspective view of one potential embodiment of the apiary awning device of the present invention in accordance with the disclosed architecture, wherein the apiary device is positioned to protect the entrance of the apiary from inclement weather.

FIG. 2 illustrates a perspective view of one potential embodiment of the apiary awning device 100 of the present invention in accordance with the disclosed architecture, wherein the apiary device 100 is used to protect an apiary 200 from inclement weather and excessive heat buildup. More specifically, the awning device 100 is securely positioned at a desired height on a front surface or wall 206 of the apiary 200 above a bottom board 202 so that the entrance 208 is protected against direct sunlight and the elements, such as rain, wind, snow, sleet and the like. The awning device 100 is also secured to the apiary 200 on a first sidewall 204 via the side panel 1024, and on a second sidewall (not shown) via the second side panel 1023. The awning device 100 is positioned to protect the entrance 208, but not prohibit the bees 220 from using the entrance 208 to enter or exit the apiary 200 or from landing on the bottom board 202.

The roof portion 102 of the awning device 100 may further comprise a reflective material on its top surface to reflect sunlight 210 away from the entrance 208, and to maintain a moderate temperature within the apiary 200. In a preferred embodiment, the awning device 100 may further comprise one or more sensors 230 (e.g., motion sensors, temperature sensors, moisture sensors, obstruction sensors, etc.) to, for example, track the egress and ingress of the bees 220, monitor the interior temperature or humidity of the apiary 200, detect if debris has clogged the entrance 208 to the apiary 200, etc.

FIG. 3 illustrates a partial perspective view of one potential embodiment of the apiary awning device 100 of the present invention in accordance with the disclosed architecture, wherein the awning device 100 is secured to the front surface or wall 206 of the apiary 200 using a screw or other fastener 300. More specifically, a fastener 300 may be screwed or secured into the front surface 206 of the apiary 200 through one or both of continuous openings 111, 112 of the awning device 100. When the awning device 100 is properly secured to the apiary 200, the roof portion 102 of the device extends over the entrance 208 of the apiary 200 in a downwardly sloping manner approximately 20-55 degrees relative to the securing sheet 108 or front wall 206 of the apiary 200 to protect the entrance 208 from both the elements and direct sunlight.

As best illustrated in FIG. 3, the awning device 100 may further comprise a channel 301 which extends along the length of the leading edge of the rectangular plate 102 and forms a gutter to catch and direct any accumulated rainwater, snow or ice melt to the sides 302 of the rectangular plate 102 so that the same does not drip over the edge of the awning device 100 and get blown into the entrance 208 by, for example, the wind.

Figure 4:
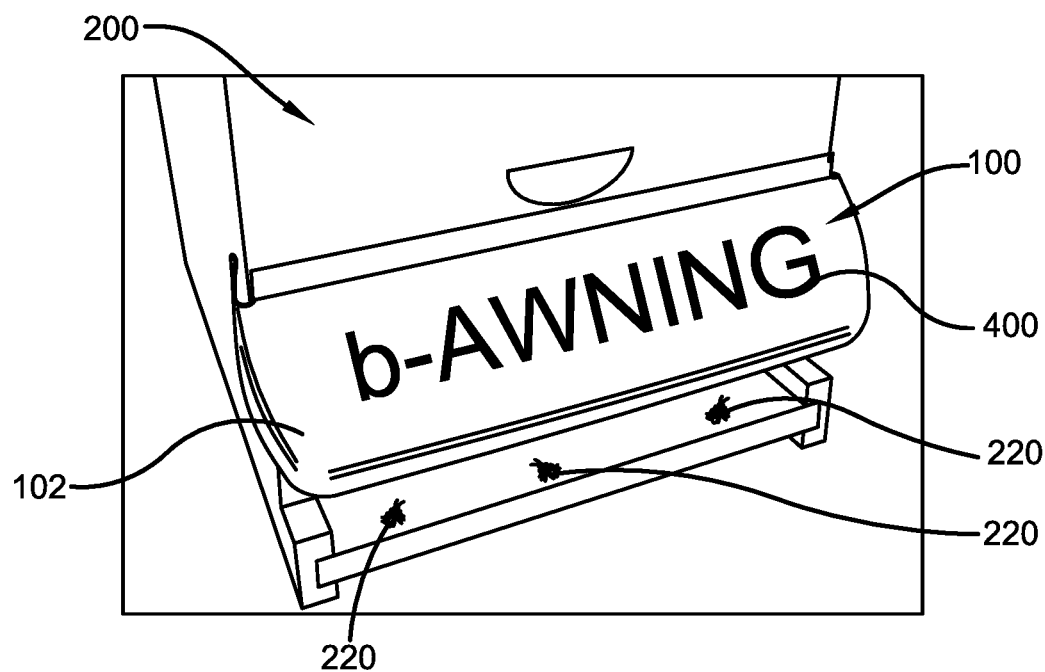
FIG. 4 illustrates a perspective view of one potential embodiment of the apiary awning device of the present invention in accordance with the disclosed architecture, wherein the apiary device is positioned to protect the entrance of the apiary from inclement weather and further comprises a logo or other indicia.

FIG. 4 illustrates a perspective view of one potential embodiment of the apiary awning device 100 of the present invention in accordance with the disclosed architecture, wherein the apiary device 100 is positioned to protect the entrance 208 of the apiary 200 from inclement weather and further comprises a logo or other indicia 400. More specifically, the awning device 100 may further include a logo or other graphic 400, such as an indicia, trademark, geometric patterns, customizable colors, fonts, embroidery, prints and/or other images or combinations thereof on, for example, the roof surface 102. Further, as clearly shown in FIG. 4, the bees 220 are not only protected from direct sunlight and inclement weather by the awning device 100, but they are also free to utilize the bottom board 202 and/or the entrance 208 to enter and exit the apiary 200.

FIG. 5 illustrates a side perspective view of one potential embodiment of the apiary awning device 100 of the present invention in accordance with the disclosed architecture, wherein the apiary device 100 is positioned to protect the entrance 208 of the apiary 200 from inclement weather, and prevent the apiary 200 from taking in rainwater which could lead to the formation of mold and mildew inside of the apiary. More specifically, the awning device 100, and channel 301 in particular, redirects water, such as rainwater 500 and snow and ice melt, away from the entrance 208 of the apiary 200.

Figure 6:
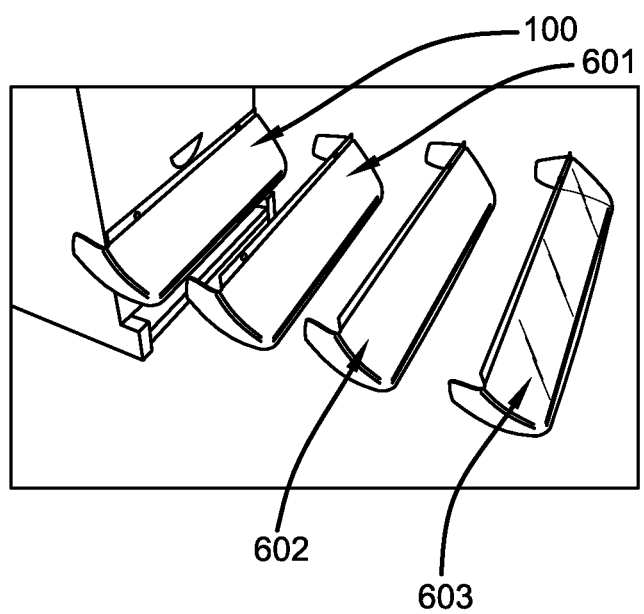
FIG. 6 illustrates a perspective view of various potential embodiments of the apiary awning device of the present invention in accordance with the disclosed architecture.

FIG. 6 illustrates a perspective view of various potential embodiments of the apiary awning device 100, 601, 602, 603 of the present invention in accordance with the disclosed architecture. More specifically, the apiary awning device of the present invention may be manufactured in various sizes, shapes, designs and color to satisfy user need and/or preference. As shown, the awning devices 100, 601, 602, 603 are of different dimensions, designs and materials. For example, in one embodiment, the awning device 100 may have dimensions of approximately 12"×6" (length× height), and dimensions of approximately 18"×9" (length× height) in another embodiment. In yet another embodiment, the awning device 100 may have dimensions of approximately 24"×10" (length×height). Notwithstanding, the length of the roof plate 102 (as measured between the two side edges) should be at least two times the width of the plate 102 (as measured between the two longitudinal edges 1021 and 1022).

In a further embodiment of the present invention, a method of securely attaching an awning device 100 to an apiary 200 is disclosed. The method comprises the steps of initially placing a securing sheet adjacent to the entrance 208 of the apiary 200 at a predetermined height such that rectangular protective surface 102 of the bee awning device 100 is in a generally downwardly sloping position away from the apiary 200, thereby protecting the entrance 208 of the apiary 200. Next, side protective panels 104, 106 of the awning device 100 are positioned on each side surface 204 of the apiary 200, and the awning device 100 is secured to the apiary 200 via fasteners 300 extending through openings 111, 112 in the device 100 and into the front surface 2026 of the apiary 200.

In one embodiment, the awning device 100 can be tilted with respect to the securing surface along the pivoting edge 1021 such that the extension angle of the bee awning device 100 can be changed as per the needs and/or preferences of a user. In this embodiment, the roof sheet 102 is pivotably hinged to the securing member 108 or, alternatively, a channel is present along the lateral length of the pivoting edge 1021 of the bee awning device 100 to tilt the bee awning device 100 within the range of 0-90 degrees with respect to the securing member 108 of the bee awning device 100.

In each of the embodiments described herein, the apiary awning device 100 of the present invention is relatively lightweight and easy to handle. The apiary awning device 100 also exhibits excellent impact resistance and durability, and the materials used for manufacturing the awning device 100 can be one or more of a metal, vinyl, laminate, plastic or fibrous composite. In other embodiments, the material may be a recycled plastic or renewable material, such as bamboo.

Figure 7:
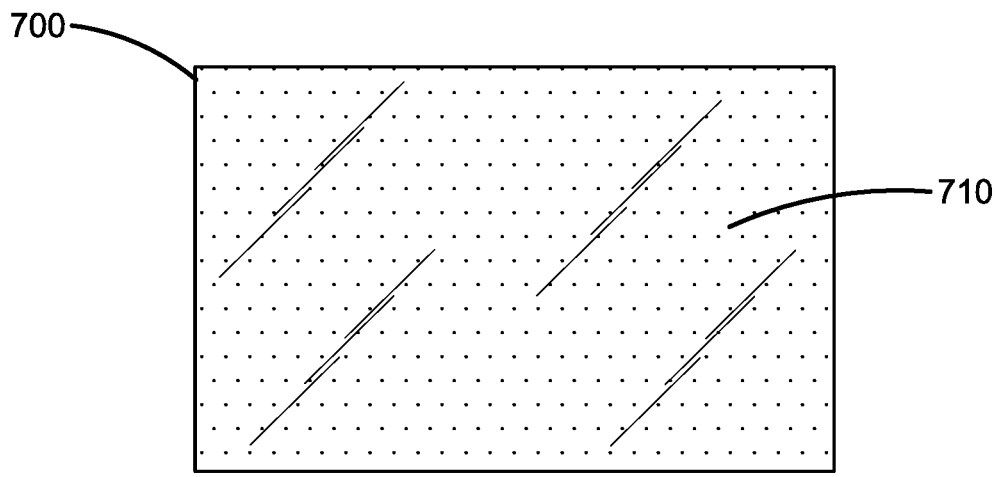
FIG. 7 illustrates a perspective view of one potential embodiment of the apiary awning device of the present invention and its reflective coating in accordance with the disclosed architecture.

FIG. 7 illustrates a perspective view of one potential embodiment of the apiary awning device 100 of the present invention and its reflective coating 710 in accordance with the disclosed architecture. More specifically, the apiary awning device 100 may be comprised of a planar sheet 700 and a reflective material 710 disposed on the surface of the planar sheet 700. The reflective material 710 may be applied by coating, or may be purchased as a film or tape that can be applied to the planar sheet 700.

Figure 8A:
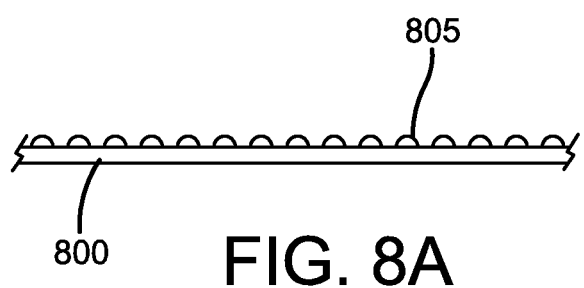
FIG. 8A illustrates an enhanced elevational view of one potential embodiment of the apiary awning device of the present invention and its reflective coating in accordance with the disclosed architecture, wherein the reflective coating is comprised of a plurality of glass or other beads to reflect light and heat away from the apiary.
Figure 8B:
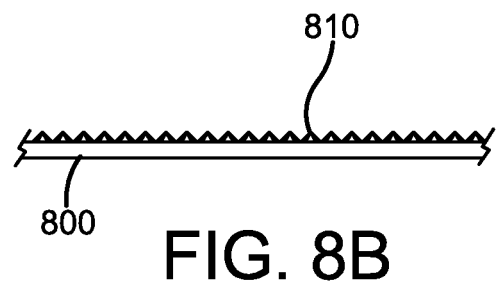
FIG. 8B illustrates an enhanced elevational view of one potential embodiment of the apiary awning device of the present invention and its reflective coating in accordance with the disclosed architecture, wherein the reflective coating is comprised of a plurality of prisms to reflect light and heat away from the apiary.

FIG. 8A illustrates an enhanced elevational view of one potential embodiment of the reflective coating 800 of the apiary awning device 100 of the present invention, wherein the reflective coating 800 is comprised of a plurality of glass or other beads 805 that are used to reflect light and heat away from the apiary 200; and FIG. 8B illustrates an enhanced elevational view of one potential embodiment of the reflective coating 800 of the apiary awning device 100 of the present invention, wherein the reflective coating 800 is comprised of a plurality of prisms 810 to reflect light and heat away from the apiary 200.

Certain terms are used throughout the following description and claim to refer to particular features or components. As one skilled in the art will appreciate, different persons may refer to the same feature or component by different names. This document does not intend to distinguish between components or features that differ in name but not structure or function. As used herein "bee awning device", "beehive protective tool", "bee box awning", and "multipurpose bee awning tool" are interchangeable and refer to the apiary awning device 100 of the present invention in its various embodiments.

Notwithstanding the forgoing, the apiary awning device 100 of the present invention and its various components can be of any suitable shape, size and configuration as is known in the art without affecting the overall concept of the invention, provided that the same accomplishes the above stated objectives. One of ordinary skill in the art will appreciate that the shape, size, configuration and material of the apiary awning device 100 as shown in the FIGS. are for illustrative purposes only, and that many other shapes, sizes, configurations and materials of the apiary awning device 100 are well within the scope of the present disclosure. Although the dimensions of the apiary awning device 100 are important design parameters for user convenience, the apiary awning device 100 may be of any size, shape or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An accessory for an apiary comprising:
   a plate comprising a first longitudinally extending edge, a second longitudinally extending edge, a first transversely extending end edge and a second transversely extending end edge;
   a first side panel attached to the first transversely extending end edge;
   a second side panel attached to the second transversely extending end edge;
   a securing portion attached to the first longitudinally extending edge of the plate, wherein the securing portion extends upwardly from the plate such that it is parallel to a front face of the apiary and the plate slopes downwardly from the front face; and
   a portion that extends downwardly from the second longitudinally extending edge towards a ground surface; and
   a reflective film applied to the plate; and
   a reflective beaded surface covering a portion of the plate; and
   wherein the first longitudinally extending edge is pivotally attached to the second longitudinally extending edge; and
   wherein the plate further comprises an image and a geometric pattern.

2. The accessory for an apiary as recited in claim 1, wherein the securing portion is positioned at an angle of between 90-160 degrees.

3. The accessory for an apiary as recited in claim 1, wherein the plate slopes downwardly from the front face at an angle of between 25-50 degrees.

4. The accessory for an apiary as recited in claim 1, wherein the accessory is comprised of a recycled plastic or a renewable material.

5. The accessory for an apiary as recited in claim 4, wherein the renewable material is a bamboo.

6. The accessory for an apiary as recited in claim 4, wherein the recycled plastic is at least one of a biodegradable plastic and a compostable plastic.

7. The accessory for an apiary as recited in claim 1, wherein the plate has a length that is at least two times a width of the plate.

8. The accessory for an apiary as recited in claim 1, wherein the plate further comprises a channel near the second longitudinally extending edge to channel water away from an opening in the apiary.

9. An apiary and awning combination comprising:
   an apiary comprised of a pair of side walls, a back panel, a front panel, a roof, and a bottom board defining an interior, wherein the interior is accessed by an opening in the front panel that is positioned above the bottom board;
   an awning comprised of a flat plate and a pair of side panels that extend at least partially long the pair of side walls of the apiary;
   a securing plate pivotally hinged to the flat plate along a first longitudinal edge of the flat plate, the flat plate movable between 90 and 160 degrees with respect to the securing plate; and
   a lip disposed along a second longitudinal edge of the flat plate and at a second angle to the flat plate; and
   a reflective coating applied to the roof; and
   a plurality of glass beads covering the flat plate for reflecting light and heat; and
   an image positional on the roof.

10. The apiary and awning combination as recited in claim 9, wherein the awning is comprised of one of a recycled material or a renewable material.

11. The apiary and awning combination as recited in claim 9, wherein the awning further comprises a channel along the second longitudinal edge.

12. An apiary awning attachable to an apiary, the apiary awning comprising:
- a rectangular plate comprising first and second longitudinally extending edges and first and second transversely extending sides, wherein the first and second transversely extending sides collectively define a width, and the first and second longitudinally extending edges collectively define a length;
- a securing plate pivotally hinged to and extending outwardly in a first direction from the first longitudinally extending edge of the rectangular plate; and
- a protective lip extending outwardly in a second direction from the second longitudinally extending edge, wherein the first direction is opposite the second direction;
- a reflective coating applied to the rectangular plate
- a plurality of prisms covering a portion of the rectangular plate for reflecting light and heat; and
- wherein the first longitudinally extending edge of the rectangular plate is pivotal between 0 and 90 degrees with respect to the securing plate; and
- wherein the plate further comprises an embroidery.

13. The apiary awning as recited in claim 12 further comprising a channel positioned adjacent to the second longitudinally extending edge and a sensor for detecting at least one of a debris, a temperature, and a moisture.

14. The apiary awning as recited in claim 12, wherein the length is at least two times the width.

* * * * *